United States Patent
Takahama

(10) Patent No.: US 6,813,071 B2
(45) Date of Patent: Nov. 2, 2004

(54) INVERTED MICROSCOPE

(75) Inventor: Yasuteru Takahama, Kodaira (JP)

(73) Assignee: Olympus Optical Co., Ltd., Tokyo (JP)

( * ) Notice: Subject to any disclaimer, the term of this patent is extended or adjusted under 35 U.S.C. 154(b) by 209 days.

(21) Appl. No.: 10/102,098

(22) Filed: Mar. 19, 2002

(65) Prior Publication Data

US 2002/0154397 A1 Oct. 24, 2002

(30) Foreign Application Priority Data

Mar. 23, 2001 (JP) .................................... 2001-084843

(51) Int. Cl.[7] .............................................. G02B 21/00
(52) U.S. Cl. ...................... 359/381; 359/382; 359/383; 359/384; 359/385; 359/386; 359/387; 359/380
(58) Field of Search ........................ 359/381–391, 359/380, 363, 368, 370–375, 392–395

(56) References Cited

U.S. PATENT DOCUMENTS

| | | | |
|---|---|---|---|
| 5,235,459 A | * | 8/1993 | Meyer et al. ................ 359/372 |
| 6,160,662 A | * | 12/2000 | Uchida et al. .............. 359/390 |
| 6,404,546 B2 | * | 6/2002 | Toyoda et al. .............. 359/392 |

FOREIGN PATENT DOCUMENTS

| | | |
|---|---|---|
| DE | 26 40 974 | 3/1978 |
| JP | 57-037848 | 3/1982 |
| JP | 63-138314 | 6/1988 |
| JP | 7-35986 A | 2/1995 |
| JP | 08-043741 | 2/1996 |
| JP | 11-72715 A | 3/1999 |
| JP | 11-194277 A | 7/1999 |

OTHER PUBLICATIONS

Related U.S. patent application Ser. No. 09/955,867, filed Sep. 19, 2001; Inventors: Yasuteru Takahama et al; Title: Inverted Microscope.
Related U.S. patent application Ser. No. 10/091,914, filed Mar. 6, 2002; Inventor: Yasuteru Takahama; Title: Inverted Microscope System.

* cited by examiner

*Primary Examiner*—Mohammad Sikder
(74) *Attorney, Agent, or Firm*—Frishauf, Holtz, Goodman & Chick, P.C.

(57) ABSTRACT

There is disclosed an inverted microscope comprising an objective lens disposed under a sample, a tube lens which is disposed in a light path of an observation light emitted from the objective lens and which forms the observation light into an image, an incident light illumination optical device which is disposed between the objective lens and the tube lens, and which introduces incident light illumination into the light path of the observation light, and an input/output port which is disposed between the incident light illumination optical device and the tube lens, and which splits a light flux from the light path of the observation light or introduces the light flux into the light path of the observation light.

8 Claims, 3 Drawing Sheets

INVERTED MICROSCOPE

CROSS-REFERENCE TO RELATED APPLICATIONS

This application is based upon and claims the benefit of priority from the prior Japanese Patent Application No. 2001-084843, filed Mar. 23, 2001, the entire contents of which are incorporated herein by reference.

BACKGROUND OF THE INVENTION

1. Field of the Invention

The present invention relates to an inverted microscope for magnifying and observing an observation sample laid on a stage by an objective lens disposed right under the sample.

2. Description of the Background Art

An inverted microscope has broadly been used in fields such as:

(1) Researches of respective fields of medicine and physiology in which living cells are handled; and (2) Industrial researches/inspections for observing tissues and detecting defects and contents of various metal materials.

In recent years, cases to require functions other than a simple observation and photography have increased in researches and inspections in which the inverted microscope is used. Concretely, in addition to the visual observation and photography of a sample by an eyepiece, there are applications as follows. Examples of the applications include: using a TV camera to photograph the sample; observing a change of the sample with an elapse of time and performing an image processing; irradiating the sample with a laser beam and observing the change of the sample; and the like. Moreover, in the industrial researches and inspections for handling the metal materials, the examples of the applications also include: assembling a macro observation apparatus for observing the sample in a broader field of view with a low magnification; and combining an infrared ray and an imaging device for the infrared ray to observe an internal structure of the sample, not the surface of the sample.

For a purpose of increasing photography light paths which have an equal projection magnification, the following inverted microscope is known. The light successively transmitted through an objective lens and tube lens is split into photography light paths of three or more directions different from one another (see Jpn. Pat. Appln. KOKAI Publication No. 7-35986).

According to the above-described inverted microscope, three or more photography apparatuses such as a still camera and TV camera can be mounted. Moreover, the image magnifications of the sample images formed on the respective photography light paths by the tube lens can be set to be equal. Therefore, it is possible to easily compare and collate the respective images.

Additionally, in the inverted microscope, the light successively passed through the objective lens and tube lens is split into the photography light paths of three or more different directions. Therefore, the inverted microscope has to constantly include a first optical device in a microscope main body, and a so-called light path switch mechanism in which the position of the first optical device on the light path is switched and supply states of the light into the respective photography light paths are set to be variable.

Therefore, it is useless for a user who needs no photography light path to constantly include the first optical device and the light path switch mechanism for switching the first optical device, and this is a factor of cost increase of the microscope main body. Moreover, when TV observation is to be performed using an infrared ray in the industrial research/inspection, the tube lens and first optical device in the microscope main body have to be changed to types for transmission of the infrared ray by changing coatings in many cases. For this change, the inverted microscope needs to be transported to a manufacturing factory from the user, and further disassembling, modifying, and assembling operations of the inverted microscope are required. Therefore, a problem occurs that much labor and time are required for changing the types.

Moreover, the following inverted microscope is also known. A stage support member is expanded/contracted with respect to a microscope base, or a spacer member is disposed between at least one of the stage and microscope base and the stage support member, and thereby an optical system can newly be added to a structure (see Jpn. Pat. Appln. KOKAI Publication No. 11-72715).

According to the inverted microscope, a new space is formed between the stage and the microscope base. Moreover, the new optical system can be added and is disposed in the space. Furthermore, when the new optical system is disposed in a parallel flux emitted from the objective lens between the objective lens disposed under the stage and the tube lens disposed on the microscope base, optical capabilities of the microscope can substantially be prevented from being deteriorated.

When the stage support member is expanded/contracted and the spacer member is disposed as described above, a height of the stage from a base upper surface changes. Therefore, there are problems as follows.

(1) Operability of a stage handle for moving the stage in a horizontal plane and changing an observation portion of the sample is deteriorated.

(2) The heights of peripheral apparatuses such as a manipulator for use together with the inverted microscope from the base upper surface also need to be changed.

(3) The operation of removing the stage and stage support member, adding the new optical system, disposing the spacer member and assembling the stage and stage support member again is troublesome.

(4) The disposed spacer member deteriorates a degree to which the optical axis of the objective lens crosses at right angles to the stage surface, and optical capabilities are deteriorated.

Moreover, in the inverted microscopes including a filter block disposed below the stage of the microscope main body and a lighting projection unit for projecting an incident light illumination light onto the sample via the filter block, the inverted microscope including light receiving means for receiving the light from the sample instead of the lighting projection unit is also known (see Jpn. Pat. Appln. KOKAI Publication No. 11-194277).

According to the inverted microscope, when the light receiving means is mounted instead of the lighting projection unit, the light from the sample reflected by the filter block is received by the light receiving means, and converted to an electric signal. Therefore, even with a popular inverted microscope which has no image output port, it is possible to easily observe the microscope image and to detect the light amount.

However, the lighting projection unit is detached from the inverted microscope, and therefore a problem occurs that the microscope cannot be applied to the industrial researches/ inspections such as the tissue observation of the metal materials requiring incident light illumination.

BRIEF SUMMARY OF THE INVENTION

An object of the present invention is to provide an inverted microscope in which various auxiliary apparatuses applicable to the inverted microscope including incident light illumination for industrial use can easily be assembled, and which is inexpensive and superior in operability.

According to an aspect of the present invention, there is provided an inverted microscope comprising: an objective lens disposed under a sample; a tube lens which is disposed in a light path of an observation light emitted from the objective lens and which forms the observation light into an image; an incident light illumination optical device which is disposed between the objective lens and the tube lens, and which introduces incident light illumination into the light path of the observation light; and an input/output port which is disposed between the incident light illumination optical device and the tube lens, and which splits a light flux from the light path of the observation light or introduces the light flux into the light path of the observation light.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described hereinafter with reference to the drawings.

First Embodiment

Figure 1:
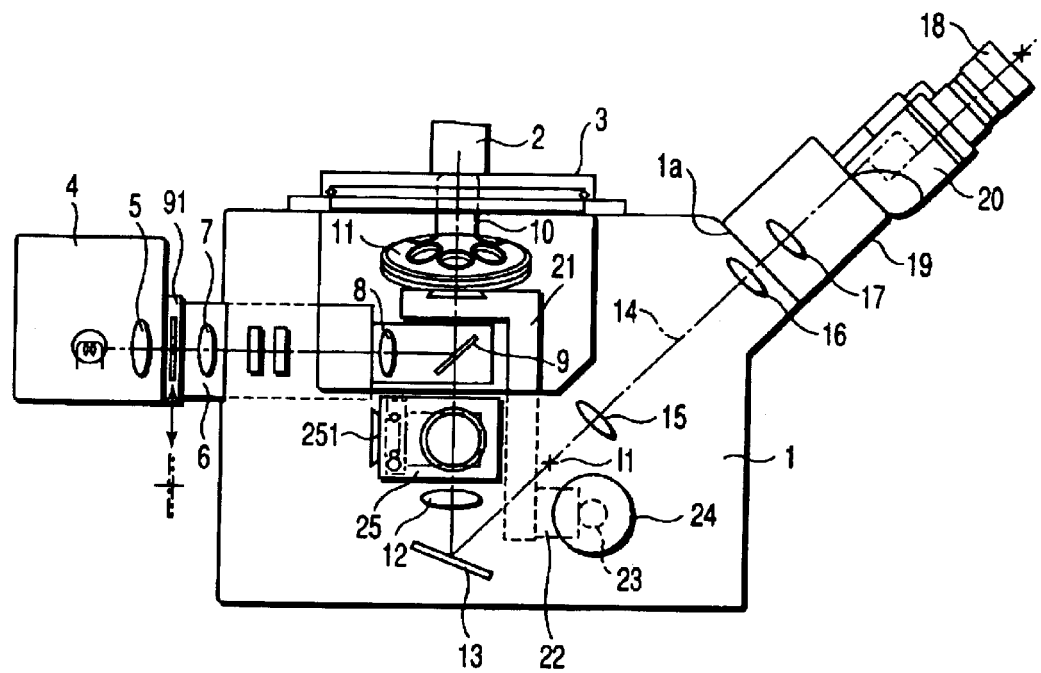
FIG. 1 is a diagram showing a schematic configuration according to a first embodiment of the present invention.
Figure 2:
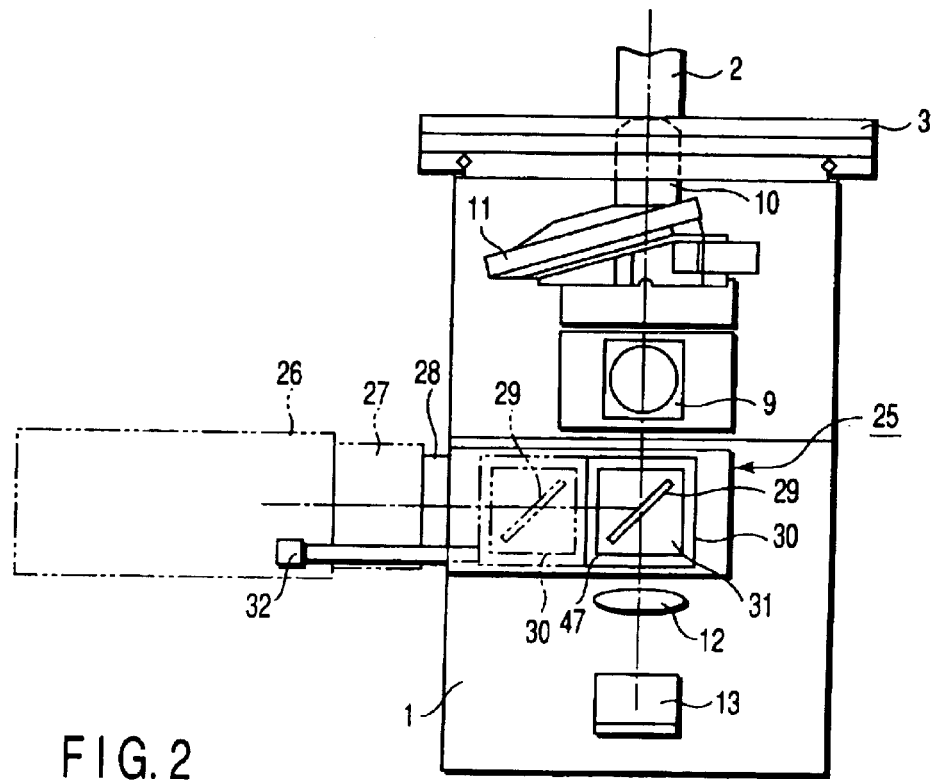
FIG. 2 is a front view of a vertical light path portion including an objective lens of an inverted microscope according to the first embodiment.

FIGS. 1 and 2 are configurations of an inverted microscope to which a first embodiment of the present invention is applied. FIG. 1 is a side view. FIG. 2 is a front view of a vertical light path portion including an objective lens of the inverted microscope shown in FIG. 1.

In FIG. 1, a microscope main body (hereinafter referred to as the "main body") 1 has a substantially concave shape. Upward projecting portions called microscope legs are formed before and after the main body 1. A stage 3 is disposed above the microscope legs. An observation sample 2 is laid on the stage 3.

A light flux from a light source 4 for illumination such as a halogen lamp is introduced into a projector tube 6 via a collector lens 5. The light flux guided into the projector tube 6 is incident upon a semi-transmission mirror 9 as an incident light illumination optical device via relay lenses 7, 8 for relaying the light collected by the collector lens 5. In this case, the projector tube 6 is fixed in an opening (not shown) disposed in a central portion of the rear microscope leg of the main body 1, and constitutes an incident light illumination apparatus.

An IR cut filter 91 cuts infrared components included in the light source 4 for illumination before the collector lens 5.

The observation sample 2 is irradiated with the light flux reflected by the semi-transmission mirror 9 via an objective lens 10. A revolver 11 holds a plurality of objective lenses (only one lens is shown in FIGS. 1 and 2). One of the objective lens 10 including the plurality of objective lenses is selectively disposed in a light path.

The reflected light from the observation sample 2 is transmitted through the semi-transmission mirror 9. With respect to the transmitted light, a tube lens 12 forms an magnified image of the observation sample 2 together with the objective lens 10. The magnified image is incident upon a reflective mirror 13. The reflective mirror 13 is disposed on the lowermost end portion of the main body 1. The reflective mirror 13 obliquely upwards (by 45° here) reflects the image forming light flux of the observation sample 2 vertically downwards emitted by the objective lens 10 and the tube lens 12. Moreover, an intermediate image is formed on an observation light path 14 in which the image forming light flux is directed obliquely upwards.

The intermediate image I1 is incident upon relay lenses 15, 16. These relay lenses 15, 16 relay the intermediate image I1, and shape the light flux emitted from a lens tube mounting portion 1a positioned above the front portion of the main body 1 into a parallel light flux. Moreover, the intermediate image I1 relayed by these relay lenses 15, 16 is formed in the position of an eyepiece 18 via a tube lens 17. When the formed intermediate image I1 enters observer's eyes via the eyepiece 18, the image of the observation sample 2 is observed. In this case, the tube lens 17 is disposed inside a lens tube 19 detachably attached to the lens tube mounting portion 1a. Moreover, the eyepiece 18 is attached to a binocular portion 20, integrally disposed on the lens tube 19, for observing the image with both eyes.

The revolver 11 is held by a revolver holder 21. The revolver holder 21 is supported such that the holder can linearly move in a vertical direction with respect to the center portion of the main body 1. Moreover, a rack 22 is mounted on the revolver holder 21. A pinion shaft 23 which meshes with the rack 22 is disposed coaxially with a focusing handle 24. Thereby, when the focusing handle 24 rotates, the pinion shaft 23 rotates. Then, the rack 22 meshing with the pinion shaft 23 and the revolver holder 21 with the rack 22 fixed thereto are vertically driven. Thereby, a relative distance between the observation sample 2 laid on the stage 3 and the objective lens 10 held by the revolver 11 changes. As a result, focus adjustment is enabled in order to form the intermediate image I1 of the observation sample 2 formed by the objective lens 10 and tube lens 12 in the predetermined position.

On the other hand, an option port unit 25 is inserted as the input/output port between the semi-transmission mirror 9 and tube lens 12 inside the main body 1. The option port unit 25 can be inserted/removed along a dovetail portion 251 from the side surface of the main body 1.

A laser beam source 26 is disposed as an auxiliary apparatus on the end portion of the option port unit 25 as shown in FIG. 2. In this case, the laser beam source 26 is supported by an adapter 27. The adapter 27 is fixed to a base member of the option port unit 25 via a mounting portion 28. Moreover, a mirror 29 is disposed as an optical device for the port on the light path of the light flux from the laser beam source 26 inside the option port unit 25. The mirror 29 is fixed to a mirror frame 30. The mirror frame 30 is constituted to be linearly movable in a left to right direction of FIG. 2 with respect to the base member of the option port unit 25 via a guide mechanism 31. Thereby, the mirror 29 can be inserted/removed with respect to the optical axis of the objective lens 10. In this case, when the mirror 29 is positioned on the optical axis of the objective lens 10, the mirror reflects the light flux from the laser beam source 26 on the objective lens 10 side, and the observation sample 2 is irradiated via the objective lens 10.

The laser beam source 26 is used, for example, in the following intended purposes in an industrial field. Examples of the purposes include: (1) to irradiate a sample with a laser beam having a high energy density and trap materials (laser-trap) similarly as living cells in the sample in which an infinite number of micro spherical polymer materials are arranged in a liquid medium; and (2) to repair a pattern (laser-repair) in the samples such as an IC chip.

A switch lever 32 is disposed on a movable side of the guide mechanism 31, that is, on the mirror frame 30. The switch lever 32 allows the mirror frame 30 to linearly move via the guide mechanism 31 as transfer means. The objective lens 10 of the mirror 29 is inserted/removed with respect to the optical axis by the switch lever 32.

In this configuration, first the option port unit 25 is moved along the dovetail portion 251 from the side surface of the main body 1 and mounted.

Subsequently, the switch lever 32 is pushed toward the inside of the main body 1. The mirror frame 30 linearly operates rightwards in FIG. 2 via the guide mechanism 31. Thereby, the mirror 29 is positioned in a solid-line position of FIG. 2 on the optical axis of the objective lens 10.

When the laser beam is generated from the laser beam source 26 in this state, the laser beam is reflected on the objective lens 10 side by the mirror 29, and the observation sample 2 is irradiated via the objective lens 10.

Subsequently, when the switch lever 32 is pulled out of the main body 1, the mirror frame 30 linearly operates in a left direction of FIG. 2 via the guide mechanism 31. Thereby, the mirror 29 is retracted to a broken-line position of FIG. 2 deviating from the optical axis of the objective lens 10.

The laser beam emitted from the laser beam source 26 is not introduced into the objective lens 10 in this state. The light flux from the light source 4 for illumination is reflected by the semi-transmission mirror 9, and the observation sample 2 is irradiated via the objective lens 10. Subsequently, the reflected light from the observation sample 2 is transmitted through the semi-transmission mirror 9, and is incident upon the reflective mirror 13 by the tube lens 12. The light reflected by the reflective mirror 13 is formed as the intermediate image I1 on the observation light path 14. The intermediate image I1 is formed in the position of the eyepiece 18 via the relay lenses 15, 16 and tube lens 17. Thereby, after the observation sample 2 is irradiated with the laser beam, the change of the observation sample 2 can be visually observed.

Additionally, the laser beam source 26 is illustrated above as the auxiliary apparatus. The mirror 29 together with the mirror frame 30 may be replaced with other optical devices such as a dichroic mirror which reflects only a specified wavelength band depending on the combined auxiliary apparatus.

Moreover, the laser beam source 26 having a relatively long wavelength is used in the applications such as the laser trap, and the mirror 29 may preferably be replaced with a dichroic mirror which reflects a long wavelength side including the wavelength band of the laser beam source 26 and which transmits a shorter wavelength side. Thereby, while the observation sample 2 is observed by the light source 4 for illumination, it is possible to radiate the laser beam.

According to the first embodiment, only the relatively simple configuration including the mirror 29, and the guide mechanism 31 for inserting/removing the mirror 29 together with the mirror frame 30 with respect to the light path constitutes the option port unit 25 for irradiating the observation sample 2 with the light from the laser beam source 26 as the auxiliary apparatus. Additionally, in the first embodiment, the option port unit 25 is constituted to be attachable/detachable with respect to the main body 1. Thereby, the option port unit 25 can be supplied later to a user who requires the unit. Moreover, since the option port unit 25 is disposed in the portion of the parallel light between the objective lens 10 and the tube lens 12, the light flux is advantageously split or introduced, and a system has merits. Therefore, in the inverted microscope according to the first embodiment, the cost of the main body 1 can be minimized as compared with the inverted microscope in which the optical device for switching the light path is permanently disposed in the microscope main body. Additionally, in the inverted microscope according to the first embodiment, workability or operability can be prevented from being deteriorated as compared with the inverted microscope in which the height of the stage is changed in order to newly add a conventional optical system. Moreover, the inverted microscope according to the first embodiment can also be applied to the inverted microscope for the industrial use in which the incident light illumination is required.

Second Embodiment

Figure 3:
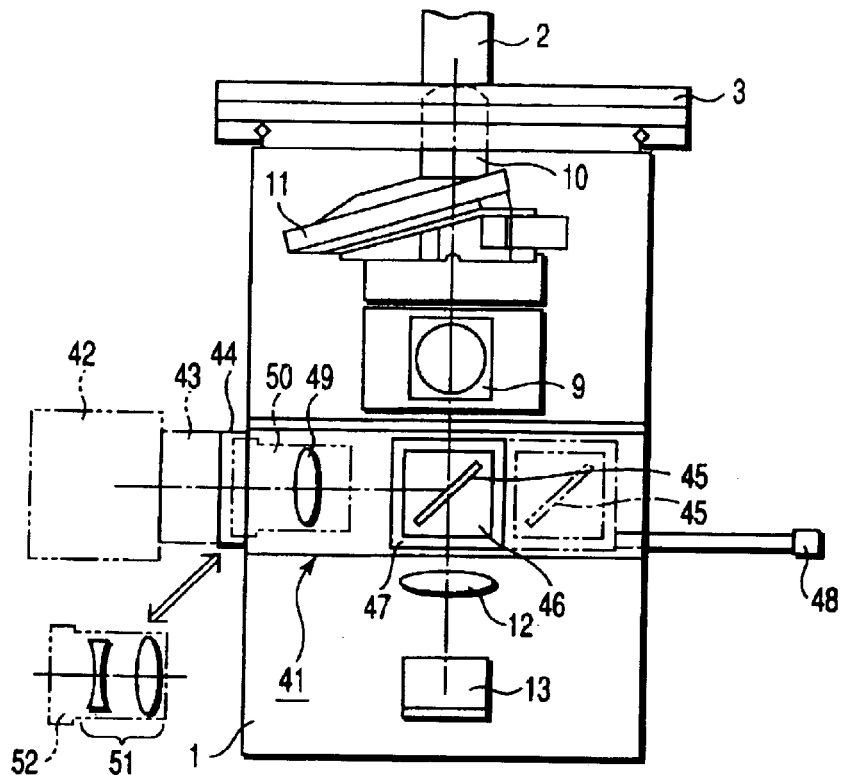
FIG. 3 is a front view of the vertical light path portion including the objective lens of the inverted microscope according to a second embodiment of the present invention.

A second embodiment of the present invention will be described with reference to FIG. 3. FIG. 3 is a front view of the vertical light path portion including the objective lens of the inverted microscope. The inverted microscope shown in FIG. 3 is different from the inverted microscope described in the first embodiment only in the configuration of the option port unit, and the other configurations are the same. Therefore, in FIG. 3, the same part as that of FIGS. 1 and 2 is denoted with the same reference numerals and the description thereof will be omitted.

In FIG. 3, an option port unit 41 is inserted between the semi-transmission mirror 9 and the tube lens 12 inside the main body 1. Moreover, the option port unit 41 can be inserted/removed along the dovetail portion (not shown) from the side surface of the main body 1.

A TV camera 42 including an imaging device such as CCD is disposed as the auxiliary apparatus on the end portion of the option port unit 41. In this case, the TV camera 42 is supported by an adapter 43, and fixed to the base member of the option port unit 41 via a mounting portion 44.

Moreover, a semi-transmission mirror 45 is disposed inside the option port unit 41 so that the mirror can be inserted/removed with respect to the optical axis of the objective lens 10. The semi-transmission mirror 45 is fixed to a semi-transmission mirror frame 46. The semi-transmission mirror frame 46 can linearly move in the left to right direction of FIG. 3 with respect to the base member of the option port unit 41 via a guide mechanism 47. Thereby, the semi-transmission mirror 45 can be inserted/removed with respect to the optical axis of the objective lens 10. In this case, when the semi-transmission mirror 45 is positioned on the optical axis of the objective lens 10, a part (e.g., about 50%) of the light reflected from the observation sample 2 and collected by the objective lens 10 is deflected on the TV camera 42, and the remaining light is transmitted on the tube lens 12.

A switch lever 48 is disposed on the movable side of the guide mechanism 47, that is, on the semi-transmission mirror frame 46. The switch lever 48 allows the mirror frame 46 to linearly move via the guide mechanism 47. The semi-transmission mirror 45 can be inserted/removed with respect to the optical axis of the semi-transmission mirror 45 by the switch lever 48.

A tube lens 49 is disposed between the semi-transmission mirror .45 and the TV camera 42. The tube lens 49 is a lens for forming the light deflected by the semi-transmission mirror 45 and reflected from the observation sample 2 into an image on the imaging device of the TV camera 42, and is incorporated in a tube lens unit 50. The tube lens unit 50 is detachably attached inside the option port unit 41.

In this configuration, first the option port unit 41 is moved along the dovetail portion from the side surface of the main body 1 and mounted.

Subsequently, when the switch lever 48 is pushed toward the inside of the main body 1, the semi-transmission mirror frame 46 linearly operates leftwards in FIG. 3 via the guide mechanism 47. Thereby, the semi-transmission mirror 45 is positioned in the solid-line position of FIG. 3 on the optical axis of the objective lens 10.

First in this state, the light flux from the lighting light source (not shown) is reflected by the semi-transmission mirror 9. Subsequently, the observation sample 2 is irradiated with the reflected light via the objective lens 10. The reflected light from the observation sample 2 is incident upon the semi-transmission mirror 45 via the semi-transmission mirror 9. A part (e.g., about 50%) of the light incident upon the semi-transmission mirror 45 is deflected on the TV camera 42, and is formed into the image on the imaging device of the TV camera 42 via the tube lens 49. Thereby, the TV camera 42 outputs a photography signal. The signal is displayed as the image in a TV monitor (not shown), and is thereby observed.

When the switch lever 48 is pulled out of the main body 1, the semi-transmission mirror frame 46 linearly operates in the right direction of FIG. 3 via the guide mechanism 47. Thereby, the semi-transmission mirror 45 is retracted to the broken-line position of FIG. 3 which deviates from the optical axis of the objective lens 10.

In this state, the reflected light from the observation sample 2 is not introduced on the TV camera 42. Therefore, the reflected light from the observation sample 2 is transmitted through the semi-transmission mirror 9, and is incident upon the reflective mirror 13 via the tube lens 12. The light reflected by the reflective mirror 13 is formed as the intermediate image I1 on the observation light path 14. The intermediate image I1 is formed in the position of the eyepiece 18 via the relay lenses 15, 16 and tube lens 17, and visually observed.

The tube lens unit 50 can be replaced with another tube lens unit 52 including tube lenses 51 having different specifications such as magnification in accordance with the size of the imaging device of the TV camera 42 to be combined. Additionally, in the second embodiment, examples of the tube lens 49 include a tube lens having an image forming magnification of 0.5× in half the focal distance of the tube lens 12, and examples of the tube lens 51 include a tube lens having an image forming magnification of 0.35× in the focal distance which is about ⅓ of the focal distance of the tube lens 12.

Moreover, when the camera for infrared rays (IR) is combined as the TV camera 42 in order to observe the inside of the metal sample, instead of the tube lens 49 (51), a tube lens for IR having a characteristic of sufficiently transmitting the infrared rays (IR) is used.

Furthermore, it is also possible to prepare another tube lens which has a magnification larger or smaller than that of the tube lens 49 (and 51). The tube lens suitable for the TV camera 42 to be combined with the inverted microscope can be selected from the tube lenses which have different specifications such as the magnification and wavelength characteristics. Therefore, there is an advantage that the applications are expanded.

Additionally, also in the second embodiment, the semi-transmission mirror 45 together with the semi-transmission mirror frame 46 can be replaced. Therefore, when the TV camera 42 combined with the inverted microscope is a camera for infrared rays (IR), the semi-transmission mirror 45 together with the mirror frame 46 is replaced with the dichroic mirror reflecting only the infrared rays (IR) wavelength band, and thereby an efficient IR observation is enabled.

Moreover, when the IR observation is performed, the IR cut filter 91 shown in FIG. 1 is removed from the lighting light path, and the observation sample 2 is sufficiently irradiated with the infrared components of the light source 4 for illumination. Furthermore, instead of the tube lens unit 50 (or the tube lens unit 52), a tube lens unit having a characteristic of sufficiently transmitting the infrared rays is used.

As described above, the tube lens unit 50 (52) in which the tube lens 49 (51) different in the specifications such as the magnification is incorporated can be detachably attached to the option port unit 41 in accordance with the TV camera 42 to be combined. Therefore, when the TV camera 42 is mounted, the tube lens having a desired reduction ratio/ magnification is selected from the tube lenses having some magnifications in accordance with the size of the imaging device. Thereby, the image can be picked up in a broad field of view, and the photography is constantly enabled in an optimum state. Thereby, a satisfactory microscope observation can be realized.

The tube lens unit can be supplied as an option independent of the main body 1, and can therefore easily be replaced. Moreover, in the second embodiment, the IR cut filter 91 described in the first embodiment can easily be removed. As described above, even in the second embodiment, an operation of modifying or replacing the constituting components of the main body 1 is unnecessary. Therefore, the inverted microscope according to the second embodiment has an advantage that the microscope can easily and variously be applied. Moreover, the inverted microscope according to the second embodiment is very preferable in the changing of the photography magnification and the IR observation. This is an effect produced by the option port unit formed in the position before the light from the objective lens 10 is transmitted through the semi-transmission mirror 9 for introducing the incident light illumination light and is incident upon the tube lens 12.

Third Embodiment

Figure 4:
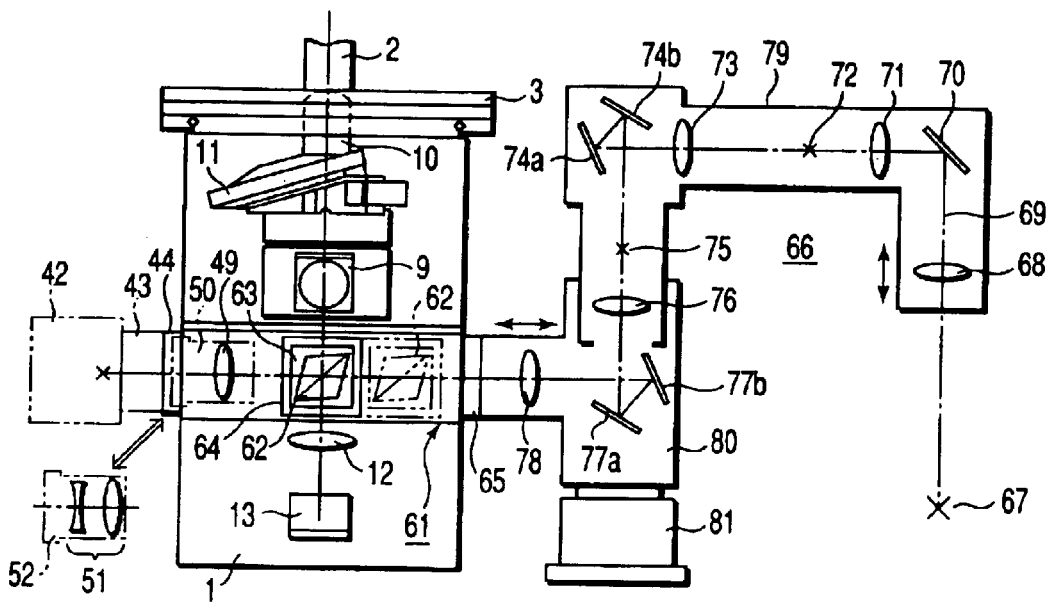
FIG. 4 is a front view of the vertical light path portion including the objective lens of the inverted microscope according to a third embodiment of the present invention.

A third embodiment of the present invention will be described with reference to FIG. 4. FIG. 4 is a front view of the vertical light path portion including the objective lens of the inverted microscope.

The inverted microscope shown in FIG. 4 is different from the inverted microscope described in the second embodiment only in the configuration of the option port unit, and the other configurations are the same. Therefore, in FIG. 4, the same part as that of FIG. 3 is denoted with the same reference numerals and the description thereof will be omitted.

In FIG. 4, an option port unit 61 is inserted between the semi-transmission mirror 9 and the tube lens 12 inside the main body 1. Moreover, the option port unit 61 can be inserted/removed along the dovetail portion (not shown) from the side surface of the main body 1.

The option port unit 61 is disposed through the opposite side surfaces of the main body 1. The TV camera 42 including the imaging device such as CCD as the auxiliary apparatus is disposed on one end portion of the option port unit 61. In this case, the TV camera 42 is supported by the adapter 43, and fixed to the option port unit 61 via the mounting portion 44.

Moreover, the tube lens 49 for forming the image on the imaging device of the TV camera 42 is disposed inside the option port unit 61. The tube lens 49 is incorporated in the tube lens unit 50. The tube lens unit 50 is detachably attached inside the option port unit 61.

The above-described configuration, action, and effect are similar to those of the second embodiment, and therefore the detailed description thereof will be omitted.

A prism 62 is disposed inside the option port unit 61 so that the prism can be inserted/removed with respect to the optical axis of the objective lens 10. The prism 62 is fixed to a prism frame 63. The prism frame 63 can linearly move in the left to right direction of FIG. 4 with respect to the base member of the option port unit 61 via a guide mechanism 64. Thereby, the prism 62 can be inserted/removed with respect to the optical axis of the objective lens 10. In this case, when the prism 62 is positioned on the optical axis of the objective lens 10, a part (e.g., about 80%) of the light reflected from the observation sample 2 and collected by the objective lens 10 is deflected toward the TV camera 42 via the tube lens 49, and the remaining light is transmitted toward the tube lens 12 side. Moreover, a switch lever (not shown) is fixed onto the prism frame 63.

On the other hand, a macro observation apparatus 66 is disposed as another auxiliary apparatus on the other end portion of the option port unit 61 via a mounting portion 65.

The macro observation apparatus 66 is constituted as follows.

An objective lens 68 is disposed with respect to a horizontally laid sample or an object 67 such as a drawing screen. The light emitted from the upper surface of the object 67 is subjected to an image forming action of the objective lens 68. An optical axis 69 is deflected into a horizontal direction from a vertical direction by a first deflector 70 constituted of the mirror. Subsequently, an image 72 is formed by the image forming action of a tube lens 71. The light from the image 72 is subjected to the image forming action by a relay lens 73. The light axis of the light from the image 72 is deflected into the vertical direction from the horizontal direction by a second deflector constituted of double-surfaces mirrors 74a, 74b, and thereafter an image 75 is formed. Furthermore, the light from the image 75 is subjected to the image forming action by a relay lens 76. The light axis of the light from the image 75 is deflected into the horizontal direction from the vertical direction by a third deflector constituted of double-surfaces mirrors 77a, 77b, subjected to the image forming action of a relay lens 78, shaped into a parallel light flux, and introduced into the main body 1 via the mounting portion 65. In this case, the objective lens 68, first deflector 70, tube lens 71, relay lens 73, mirrors 74a, 74b, and relay lens 76 are supported by a first lens tube 79. Moreover, the mirrors 77a, 77b, and relay lens 78 are supported by a second lens tube 80. Furthermore, the first lens tube 79 is supported by the second lens tube 80 so that the tube can rotate in a horizontal plane. The second lens tube 80 is supported by a support base 81 so that the position can be adjusted in the vertical direction. The objective lens 68 inside the first lens tube 79 can move along the optical axis for the magnification change. Furthermore, the relay lens 78 in the second lens tube 80 can move along the optical axis for focusing.

Even in the above-described configuration, when the switch lever (not shown) is pushed toward the inside of the main body 1, the prism 62 is positioned in a solid-line position of FIG. 4 on the optical axis of the objective lens 10. Thereby, about 80% of the parallel light flux introduced via the mounting portion 65 is deflected toward the tube lens 12 side in a direction opposite to the objective lens 10 by the prism 62, and is incident upon the reflective mirror 13. As shown in FIG. 1, the light reflected by the reflective mirror 13 is formed as the intermediate image I1 on the observation light path 14. The intermediate image I1 is visually observed by the eyepiece 18 via the relay lenses 15, 16, and tube lens 17.

On the other hand, the light flux from the lighting light source (not shown) is reflected by the semi-transmission mirror 9, the observation sample 2 is irradiated via the objective lens 10, and the light flux is incident upon the prism 62 via the semi-transmission mirror 9. Then, about 80% of the light flux is deflected toward the TV camera 42 side, and formed into the image on the imaging device of the TV camera 42 via the tube lens. 49. Thereby, the TV camera 42 outputs the photography signal, the signal is displayed as the image in the TV monitor (not shown), and thereby the image is observed.

Additionally, a part (about 20% in this case) of the parallel light flux from the object 67 introduced from the mounting portion 65 by the macro observation apparatus 66 is transmitted through the prism 62 without being reflected, and is formed into the image on the imaging device of the TV camera 42 by the tube lens 49. Therefore, in the TV camera 42, the magnified image of the observation sample 2 by the objective lens 10 and the image of the object 67 by the macro observation apparatus 66 are superposed upon each other, and picked up. It is also possible to observe the superposed image in the TV monitor, and the like.

Similarly, a part (about 20% in this case) of the light flux emitted from the observation sample 2 via the objective lens 10 is transmitted through the prism 62 without being reflected, and is visually observed by the eyepiece 18 successively via the tube lens 12, reflective mirror 13, relay lenses 15, 16, and tube lens 17. Therefore, also in the eyepiece 18, the image of the object 67 by the macro observation apparatus 66, and the magnified image of the observation sample 2 by the objective lens 10 can be superposed upon each other and observed.

When a blank sheet is laid as the object 67, it is possible to manually trace the image of the observation sample 2 on the blank sheet. This technique is known as the drawing apparatus.

Additionally, a reflection/transmission ratio of the prism 62 is not limited to 80%:20%, and 50%:50%, and the like can appropriately be selected in accordance with the application.

The switch lever (not shown) is pulled out of the main body 1, and the prism 62 is retracted to the broken-line position of FIG. 4 which deviates from the optical axis of the objective lens 10. In this case, the reflected light from the observation sample 2 is not introduced on the TV camera 42 side. Therefore, the reflected light from the observation sample 2 is incident upon the reflective mirror 13 via the tube lens 12. The light reflected by the reflective mirror 13 is formed as the intermediate image I1 on the observation light path 14, and visually observed with the eyepiece 18 via the relay lenses 15, 16, and tube lens 17.

According to the third embodiment, the option port unit 61 is disposed through the opposite side surfaces of the main body 1, and two auxiliary apparatuses can be mounted at the same time. Therefore, the observation by the TV camera 42 (IR camera), micro observation by the macro observation apparatus 66, and the like can simultaneously be realized.

Fourth Embodiment

Figure 5:
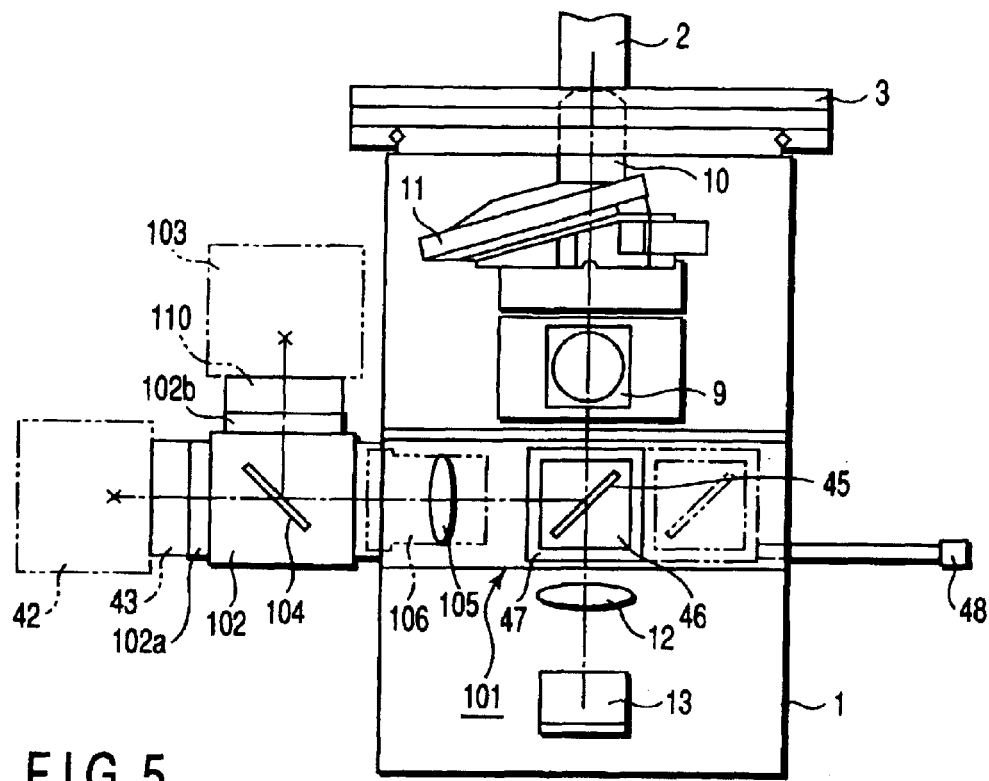
FIG. 5 is a front view of the vertical light path portion including the objective lens of the inverted microscope according to a fourth embodiment of the present invention.

A fourth embodiment of the present invention will be described with reference to FIG. 5. FIG. 5 is a front view of the vertical light path portion including the objective lens of the inverted microscope.

The inverted microscope shown in FIG. 5 is different from the inverted microscope described in the second embodiment only in the configuration of the option port unit, and the other configurations are the same. Therefore, in FIG. 5, the same part as that of FIG. 4 is denoted with the same reference numerals and the description thereof will be omitted.

In FIG. 5, an option port unit 101 is inserted between the semi-transmission mirror 9 and the tube lens 12 inside the main body 1. The option port unit 101 can be inserted/removed along the dovetail portion (not shown) from the side surface of the main body 1.

A double port portion 102 is formed on a portion projecting from the main body 1 on the left side of the option port unit 101 in FIG. 5. The TV camera 42 is mounted on one mounting portion 102a of the double port portion 102, and another TV camera ("camera for IR observation" in this example) 103 is mounted on the other mounting portion 102b. In this case, the TV camera 42 is supported by the adapter 43, and fixed onto the double port portion 102 via the mounting portion 102a. Moreover, the TV camera 103 is supported by an adapter 110, and fixed onto the double port portion 102 via the mounting portion 102b.

A dichroic mirror 104 which reflects only the light of an infrared region is disposed in the double port portion 102. The dichroic mirror 104 can move in the vertical direction with respect to a sheet surface. When the dichroic mirror 104 moves in the vertical direction with respect to the sheet surface, the dichroic mirror 104 can be retracted from the optical axis which connects the semi-transmission mirror 45 to the TV camera 42.

Additionally, in the fourth embodiment, the mounting portion 102b of the double port portion 102 is vertically disposed in an upper part. It is of course possible to dispose the mounting portion 102b in the horizontal direction (the direction vertical to the sheet surface).

Since the configuration and action of the semi-transmission mirror 45, semi-transmission mirror frame 46, guide mechanism 47, and switch lever 48 disposed in the option port unit 101 are similar to those of the second embodiment, the description thereof will be omitted.

A tube lens 105 is disposed between the semi-transmission mirror 45 and the TV camera 42 in the option port unit 101. The focal distance of the tube lens 105 is longer than that of the tube lens 49 in the second embodiment by the dimension of the double port portion 102. The tube lens 105 forms the reflected light from the observation sample 2 deflected by the semi-transmission mirror 45 into the image on the TV camera 42 or the imaging device of the TV camera 103. Additionally, the tube lens 105 is incorporated in a tube lens unit 106. The tube lens unit 106 is detachably attached inside the option port unit 101.

When the switch lever 48 is pushed inwards in the above-described configuration, the semi-transmission mirror 45 is positioned on the optical axis of the objective lens 10.

When the light flux from the lighting light source (not shown) is reflected by the semi-transmission mirror 9 in this state, the observation sample 2 is irradiated via the objective lens 10. When the reflected light from the observation sample 2 is incident upon the semi-transmission mirror 45 via the semi-transmission mirror 9, a part (e.g., about 50%) of the light is reflected toward the double port portion 102 side. When the dichroic mirror 104 inside the double port portion 102 is positioned on the optical axis connecting the semi-transmission mirror 45 to the TV camera 42, the infrared components of the light flux deflected toward the double port portion 102 side are reflected and formed into the image on the imaging device of the TV camera 103 for IR observation. The remaining visible light components excluding the infrared components are passed through the 104 as they are, and formed into the image on the imaging device of the TV camera 42.

When the dichroic mirror 104 in the double port portion 102 retreats from the optical axis connecting the semi-transmission mirror 45 to the TV camera 42, all the light fluxes deflected toward the double port portion 102 side are formed into the image on the imaging device of the TV camera 42.

Thereby, the TV camera 42 and the TV camera for IR observation 103 output a video signal. The signal is displayed as the image on the TV monitor (not shown), and observed.

When the switch lever 48 is pulled out of the main body 1, similarly as the second embodiment, the reflected light from the observation sample 2 is visually observed without being introduced toward the TV cameras 42 and 103.

Additionally, the optical device incorporated in the double port portion 102 is the dichroic mirror 104 which reflects the infrared components in the third embodiment. This is not limited, and the optical device may have different characteristics of a single semi-transmission mirror, and the like in accordance with the type of the TV camera to be mounted.

As described above, in the fourth embodiment, the double port portion is formed on one end portion of the option port unit, so that two cameras are attached. Therefore, the applications such as an application in which the usual observation image of the sample and the IR observation image are quickly switched and observed are enabled. Additionally, the number of cameras is not limited to two, and more cameras may be attached to the option port unit.

Fifth Embodiment

Figure 6:
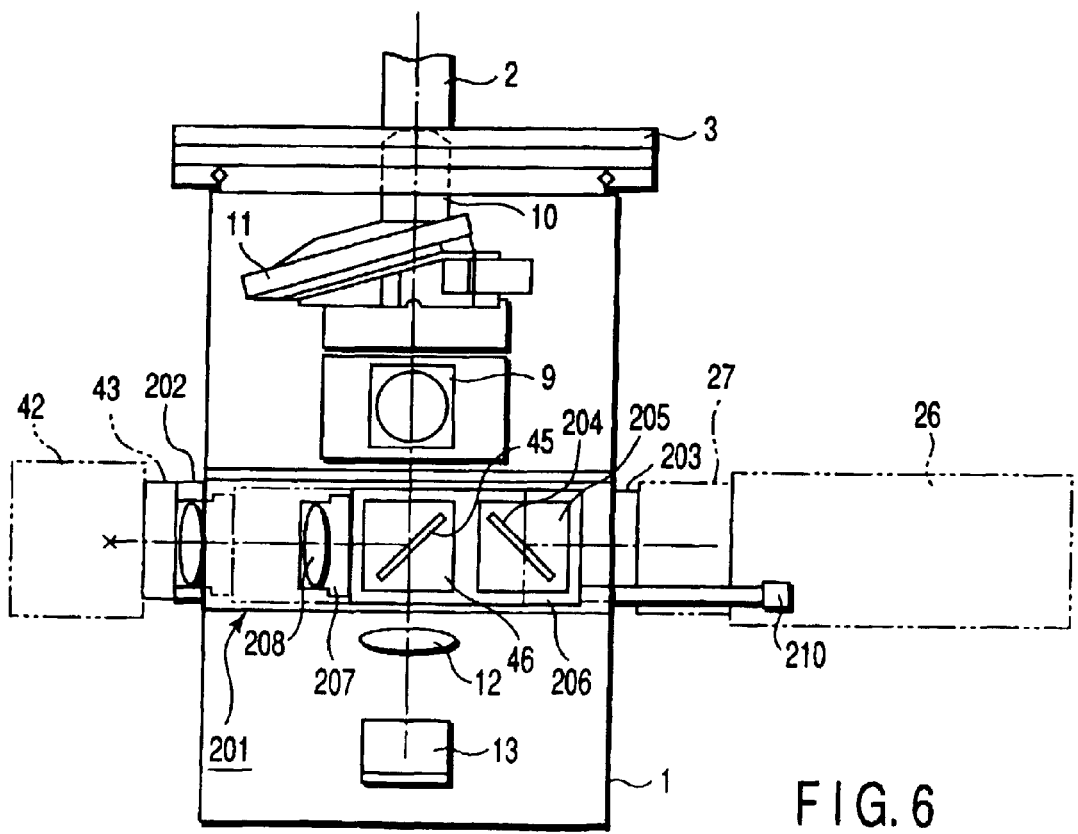
FIG. 6 is a front view of the vertical light path portion including the objective lens of the inverted microscope according to a fifth embodiment of the present invention.

A fifth embodiment of the present invention will be described with reference to FIG. 6. FIG. 6 is a front view of the vertical light path portion including the objective lens of the inverted microscope.

The inverted microscope shown in FIG. 6 is different from the inverted microscope described in the second embodiment only in the configuration of the option port, and the other configurations are the same. Therefore, in FIG. 6, the same part as that of FIG. 4 is denoted with the same reference numerals and the description thereof will be omitted.

In FIG. 6, an option port unit 201 is inserted between the semi-transmission mirror 9 and the tube lens 12 inside the main body 1. The option port unit 201 can be inserted/removed along the dovetail portion (not shown) from the side surface of the main body 1.

The TV camera 42 is mounted as the auxiliary apparatus on the left end portion of the option port unit 201 in FIG. 6. The TV camera 42 is supported by the adapter 43. The adapter 43 is fixed onto the base member of the option port unit 201 via a mounting portion 202.

Moreover, the laser beam source 26 is attached as the auxiliary apparatus to the right end portion of the option port unit 201 in FIG. 6. The laser beam source 26 is supported by the adapter 27. The adapter 27 is fixed onto the base member of the option port unit 201 via a mounting portion 203.

The semi-transmission mirror 45 and a dichroic mirror 204 are disposed inside the option port unit 201 so that the mirrors can be inserted/removed with respect to the optical axis of the objective lens 10. The semi-transmission mirror 45 is fixed to the semi-transmission mirror frame 46. The dichroic mirror 204 is fixed to a dichroic mirror frame 205. Moreover, the semi-transmission mirror 45 and dichroic mirror 204 are integrally disposed on a guide mechanism 206. Here, the semi-transmission mirror 45 and dichroic mirror 204 can linearly move with respect to the base member of the option port unit 201 in the left to right direction of FIG. 6. Thereby, the semi-transmission mirror 45 and dichroic mirror 204 can be inserted/removed with respect to the optical axis of the objective lens 10. In FIG. 6, a switch lever 210 is fixed on the right side of the guide mechanism 206. FIG. 6 shows that the semi-transmission mirror 45 is disposed on the optical axis of the objective lens 10. In this case, a part (e.g., about 50%) of the reflected light from the observation sample 2 focused on the objective lens 10 is deflected on the TV camera 42 side, and the remaining light is transmitted on the tube lens 12 side. Moreover, the dichroic mirror 204 is disposed on the optical axis of the objective lens 10 in the following state. The light flux from the laser beam source 26 is reflected on the objective lens 10 side by 100%. The observation sample 2 is irradiated with the reflected light via the objective lens 10. Moreover, the reflected light from the observation sample 2 by the light flux from the lighting light source (not shown) is passed through the semi-transmission mirror 9, and thereafter passed in the direction of the tube lens 12 from the dichroic mirror 204.

Furthermore, in FIG. 6, a tube lens 208 is fixed on the left side of the guide mechanism 206 in FIG. 6 via a tube lens frame 207. For the tube lens 208, when the semi-transmission mirror 45 is disposed on the optical axis of the objective lens 10, the light flux from the objective lens 10 deflected by the semi-transmission mirror 45 is formed into the image just on the imaging device of the TV camera 42. Moreover, when the dichroic mirror 204 is positioned on the optical axis of the objective lens 10, the tube lens 208 retreats together with the semi-transmission mirror 45 on the left side of FIG. 6.

When the switch lever 210 is pushed inwards in the above-described configuration, the dichroic mirror 204 is positioned on the optical axis of the objective lens 10.

When the laser beam source 26 emits the laser beam in this state, the laser beam is reflected on the objective lens 10 side by the dichroic mirror 204. The observation sample is irradiated with the reflected light via the objective lens 10.

When the switch lever 210 is pulled outwards, the semi-transmission mirror 45 is positioned on the optical axis of the objective lens 10, and the tube lens 208 is positioned in the predetermined position.

In this state, the light flux from the lighting light source (not shown) is reflected by the semi-transmission mirror 9, and radiated onto the observation sample 2 via the objective lens 10. When the reflected light from the observation sample 2 is incident upon the semi-transmission mirror 45 via the semi-transmission mirror 9, a part (e.g., about 50%) of the incident light is deflected on the TV camera 42 side, and formed into the image on the imaging device of the TV camera 42 via the tube lens 208. Thereby, the TV camera 42 outputs the photography signal. The signal is displayed as the image on the TV monitor (not shown), and observed.

The remaining light flux passed through the semi-transmission mirror 45 is visually observed finally with the eyepiece 18 via the tube lens 12, mirror 13, and the like.

As described above, in the fifth embodiment, the TV camera and laser beam source are mounted as the auxiliary apparatuses on the opposite sides of the option port unit. This has an advantage that both applications can efficiently be performed in one position.

The respective embodiments of the present invention can be applied not only to the inverted microscope for use in the researches of respective fields of medicine and physiology in which living cells are handled, but also to the inverted microscope including the incident light illumination for industrial use. Moreover, it is possible to combine the TV camera, introduce the laser beam, and combine the macro observation apparatus as desired by the user without increasing the cost of the microscope main body. Additionally, the input/output port can be disposed without deteriorating the operability by the change of the stage height.

The following inventions can be extracted from the above-described embodiments.

According to an aspect of the present invention, there is provided an inverted microscope comprising: an objective lens disposed under a sample; a tube lens which is disposed in a light path of an observation light emitted from the objective lens and which forms the observation light into an image; an incident light illumination optical device which is disposed between the objective lens and the tube lens, and which introduces incident light illumination into the light path of the observation light; and an input/output port which is disposed between the incident light illumination optical device and the tube lens, and which splits a light flux from the light path of the observation light or introduces the light flux into the light path of the observation light.

In the aspect of the present invention, preferred manners are as follows. Additionally, the following manners may be applied alone, or appropriately combined and applied.

(1) The input/output port includes an attachable/detachable option port unit, and the option port unit includes an optical device for the port which splits or introduces the light flux with respect to the light path of the observation light, switch means for inserting/removing the optical device for the port with respect to the light path of the observation light, and an auxiliary apparatus mounting portion on which an auxiliary apparatus is mounted to receive the light flux split from the light path of the observation light by the optical device for the port or to transmit the light flux inserted in the light path of the observation light.

(2) The inverted microscope further comprises a dovetail mechanism by which the option port unit is mounted so as to be attachable/detachable.

(3) The option port unit further includes a second tube lens disposed between the optical device for the port and the auxiliary apparatus mounting portion.

(4) The second tube lens can be replaced with another tube lens which has a different magnification.

(5) The inverted microscope further comprises an IR cut filter disposed to be attachable/detachable between the incident light illumination optical device and a light source.

(6) The optical device for the port forms two light paths to be split or introduced with respect to the light path of the observation light, and the auxiliary apparatus mounting portion is disposed for the two light paths.

(7) The option port unit has at least two mounting portions on which a photography apparatus is mounted.

According to the embodiment of the present invention, when the input/output port is used as an output port for extracting the reflected light from the sample, the light extracted via the input/output port can be used in detecting a light amount or photographing the image by the TV camera. Moreover, when the port is used as the input port for introducing the light from the outside, the light emitted to the sample from the external laser beam source can be introduced and formed into the image on the sample. Furthermore, when the light is introduced from the outside as in the macro observation apparatus, a primary image is formed in the same manner as the image of the sample passed through the objective lens, and can be observed with the eyepiece, and the like.

Moreover, according to the embodiment of the present invention, only when the input/output port is mounted as the option unit, the auxiliary apparatuses such as the TV camera and macro observation apparatus are mounted and various observations can be realized. Furthermore, the light can be introduced into these auxiliary apparatuses, when conveyance means is operated to insert the optical device into the light path.

Furthermore, according to the embodiment of the present invention, the tube lens to be inserted into the light path of the reflected light from the sample is variously replaced and various auxiliary apparatuses can thereby be handled. For example, when the TV camera or the digital camera is mounted, the tube lens is selected from the tube lenses having various types of the reduction ratio/magnification in accordance with the size of the imaging device, and the image can therefore be photographed in the broad field of view.

Additionally, according to the embodiment of the present invention, two auxiliary apparatuses of different types can be mounted, and the observation by the TV camera (IR camera), the macro observation using the macro observation apparatus, and the like can simultaneously be realized.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An inverted microscope comprising:
    an objective lens disposed under a sample;
    a tube lens which is disposed in a light path of an observation light emitted from said objective lens and which forms said observation light into an image;
    an incident light illumination optical device which is disposed between said objective lens and said tube lens, and which introduces incident light illumination into the light path of said observation light;
    an input/output port which is disposed between said incident light illumination optical device and said tube lens, and which one of: (i) splits a light flux from the light path of said observation light and (ii) introduces the light flux into the light path of said observation light; and
    an IR cut filter disposed to be attachable/detachable between said incident light illumination optical device and a light source.

2. An inverted microscope comprising:
    an objective lens disposed under a sample;
    a tube lens which is disposed in a light path of an observation light emitted from said objective lens and which forms said observation light into an image;
    an incident light illumination optical device which is disposed between said objective lens and said tube lens, and which introduces incident light illumination into the light path of said observation light; and
    an input/output port which is disposed between said incident light illumination optical device and said tube lens, and which one of: (i) splits a light flux from the light path of said observation light and (ii) introduces the light flux into the light path of said observation light;
    wherein said input/output port is attachably/detachably mounted on said inverted microscope, and said input/output port includes:
        an optical device,
        switch means for inserting/removing said optical device into the light path of said observation light, and
        an auxiliary apparatus mounting portion on which an auxiliary apparatus is mountable to one of: (i) receive the light flux split from the light path of said observation light by said optical device and (ii) to transmit the light flux inserted in the light path of said observation light.

3. The inverted microscope according to claim 2, further comprising:
    an IR cut filter disposed to be attachable/detachable between said incident light illumination optical device and a light source.

4. The inverted microscope according to claim 2, further comprising:

a dovetail mechanism by which said input/output port is attachable/detachable.

5. The inverted microscope according to claim 2, wherein said input/output port further includes a second tube lens disposed between said optical device for the port and said auxiliary apparatus mounting portion.

6. The inverted microscope according to claim 5, wherein said second tube lens is replaceable with another tube lens which has a different magnification.

7. The inverted microscope according to claim 2, wherein said input/output port includes at least two mounting portions on which a photography apparatus is mounted.

8. An inverted microscope comprising:

an objective lens disposed under a sample;

tube lens which is disposed in a light path of an observation light emitted from said objective lens and which forms said observation light into an image;

an incident light illumination optical device which is disposed between said objective lens and said tube lens, and which introduces incident light illumination into the light path of said observation light; and an input/output port which is disposed between said incident light illumination optical device and said tube lens, and which one of: (i) splits a light flux from the light path of said observation light and (ii) introduces the light flux into the light path of said observation light;

wherein said input/output port is attachably/detachably mounted on said inverted microscope, and said input/output port includes:

an optical device, switch means for inserting/removing said optical device into the light path of said observation light, and an auxiliary apparatus mounting portion on which an auxiliary apparatus is mountable to one of: (i) receive the light flux split from the light path of said observation light by said optical device and (ii) to transmit the light flux inserted in the light path of said observation light, wherein said optical device forms two light paths, and wherein said auxiliary apparatus mounting portion is disposed for said two light paths.

* * * * *